US012698738B1

(12) United States Patent

Smith et al.

(10) Patent No.: US 12,698,738 B1

(45) Date of Patent: Aug. 4, 2026

(54) LOW PRESSURE RECOVERY INLET FOR GAS TURBINE ENGINE TURBOMACHINERY ON AIRCRAFT

(71) Applicant: Rolls-Royce North American Technologies Inc., Indianapolis, IN (US)

(72) Inventors: Alan W. Smith, Indianapolis, IN (US); Michael C. Moser, Indianapolis, IN (US); Chadd D. Engel, Indianapolis, IN (US); Bryan H. Lerg, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 19/043,107

(22) Filed: Jan. 31, 2025

(51) Int. Cl.
    *F02C 7/04*     (2006.01)
    *F02C 7/05*     (2006.01)
    *F02C 7/32*     (2006.01)

(52) U.S. Cl.
    CPC ................. *F02C 7/04* (2013.01); *F02C 7/05* (2013.01); *F02C 7/32* (2013.01); *F05D 2220/50* (2013.01)

(58) Field of Classification Search
    CPC ...... F02C 7/04; F02C 7/05; F02C 7/32; F05D 2220/50
    See application file for complete search history.

(56) References Cited

U.S. PATENT DOCUMENTS

| | | | | |
|---|---|---|---|---|
| 3,054,577 | A | * 9/1962 | Wolf | F02K 3/062 |
| | | | | 244/110 B |
| 8,176,725 | B2 | * 5/2012 | Norris | F02K 3/105 |
| | | | | 60/761 |
| 11,015,521 | B2 | * 5/2021 | Curlier | B64D 27/12 |
| 2021/0262416 | A1 | * 8/2021 | Pal | F02K 3/062 |
| 2024/0376834 | A1 | * 11/2024 | Sobanski | F01D 25/162 |
| 2025/0101918 | A1 | * 3/2025 | Sibbach | F02C 3/145 |

FOREIGN PATENT DOCUMENTS

| | | | |
|---|---|---|---|
| CN | 2224939 | Y | 4/1996 |
| CN | 2262619 | Y | 9/1997 |
| CN | 2487901 | Y | 4/2002 |
| CN | 2510652 | Y | 9/2002 |
| CN | 2567382 | Y | 8/2003 |
| CN | 100460691 | C | 2/2009 |
| CN | 101382150 | A | 3/2009 |
| CN | 101566164 | A | 10/2009 |
| CN | 101566165 | A | 10/2009 |
| CN | 116792166 | A | 9/2023 |
| WO | 2010130146 | A1 | 11/2010 |

* cited by examiner

*Primary Examiner* — Michael K. Reitz

(74) *Attorney, Agent, or Firm* — Barnes & Thornburg

(57) ABSTRACT

A gas turbine engine system adapted for use with an aircraft includes a gas turbine engine. The gas turbine engine system includes a gas turbine engine and an auxiliary compressor operably coupled with the gas turbine engine. The auxiliary compressor arranged to receive air from an inlet that faces away from a direction of travel of the aircraft such that the air flowing to the auxiliary compressor has a lower mass flow rate of air at an inflight airspeed than a mass flow rate of air of a forward facing inlet so that the auxiliary compressor consumes less work from the turbine inflight.

19 Claims, 9 Drawing Sheets

LOW PRESSURE RECOVERY INLET FOR GAS TURBINE ENGINE TURBOMACHINERY ON AIRCRAFT

STATEMENT REGARDING FEDERALLY SPONSORED RESEARCH OR DEVELOPMENT

Embodiments of the present disclosure were made with government support under Contract No. FA2834-24-C-B002. The government may have certain rights.

FIELD OF THE DISCLOSURE

The present disclosure relates generally to gas turbine engines and more specifically to an auxiliary compressor for a gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where power is extracted to drive the compressor. A low pressure stage of the turbine also drives a output shaft that may drive a fan to provide thrust for a turbofan application or drive a gearbox in a turboprop or turboshaft application. For a turboprop application, the gearbox may be used to drive a propeller. Alternatively, for a turboshaft application, the gearbox may drive generators and other propulsion system accessories.

Gas turbines may also have accessory gearboxes driven off a high pressure rotor. The accessory gearboxes may drive accessories, for example fuel and oil pumps and generators.

Gas turbine engines may drive an auxiliary compressor through a low pressure driven gearbox or a high pressure gearbox for supplying additional compressed air to auxiliary systems. As a result, it may be useful to operate the auxiliary compressor in certain flight conditions, but not in others. Adding mechanisms to engage, disengage or change the speed or power of the auxiliary compressor will add weight and complexity. Therefore, it is desirous to provide features that control or reduce the power consumed by auxiliary compressors when the auxiliary compressors are not in active use.

SUMMARY

The present disclosure may comprise one or more of the following features and combinations thereof.

A gas turbine engine system is adapted for use with an aircraft. The gas turbine engine system comprises a gas turbine engine, a second compressor, and a nacelle. The gas turbine engine includes an engine core. The engine core includes first compressor, a combustor, and a turbine. The turbine is coupled with the first compressor to drive the first compressor. The second compressor is operably coupled with the gas turbine engine. The second compressor is driven by the turbine during operation of the gas turbine engine to produce a flow of auxiliary compressed air usable by the aircraft.

The nacelle extends from a fore end and an aft end thereof. A direction of a flow of air over the aircraft flows from the fore end to the aft end. The nacelle is arranged around the gas turbine engine. The nacelle is formed to define a first inlet at the fore end of the nacelle. The first inlet is arranged to direct a first portion of the flow of air aft into the first compressor. An outlet is formed in the aft end of the nacelle. The outlet is configured to direct exhaust gases from the turbine away from the nacelle. A second inlet is arranged to direct a second portion of the flow of air into the second compressor. The second inlet is oriented to at least partially face the aft end of the nacelle opposite the direction of the flow of air.

In some embodiments, the second inlet may have a lower mass flow rate of air at an inflight airspeed than a mass flow rate of air of a forward facing inlet due to lower total pressure so that the second compressor consumes less work from the turbine when the aircraft is inflight.

In some embodiments, the nacelle may include a plenum disposed between the second inlet and the second compressor. The plenum may be configured to receive the flow of air from the second inlet before the flow of air enters the second compressor.

In some embodiments, the plenum may include at least one anti-swirl structure configured to reduce distortion of the flow of air. In some embodiments, the plenum may include a plurality of anti-swirl vanes.

In some embodiments, the nacelle may include a valve coupled to the second inlet. The valve may be configured to move with respect to the nacelle to at least partially block the flow of air through the second inlet. The valve may be configured to pivot or rotate with respect to the nacelle to at least partially block the flow of air through the second inlet.

In some embodiments, the second inlet may include at least one inlet guide vane that is configured to control an air flow rate into the second compressor.

In some embodiments, the second inlet and the second compressor may be oriented in the same direction. In some embodiments, the second inlet may be oriented parallel to the direction of the flow of air over the nacelle.

In some embodiments, the second inlet may be disposed at an angle relative a central axis of the second compressor. In some embodiments, the angle of the second inlet is between 0 and 90 degrees relative to the central axis of the second compressor.

In another embodiment, a gas turbine engine system is adapted for use with an aircraft. The gas turbine engine system comprises a gas turbine engine, a second compressor, and an airframe. The gas turbine engine includes an engine core having first compressor, a combustor, and a turbine. The second compressor is operably coupled with the gas turbine engine.

The airframe includes fuselage, a wing, a nacelle, a nose, and a tail disposed aft of the nose such that a direction of a flow of air over the airframe moves from the nose of the airframe aft towards the tail. The nacelle extends from a fore end and an aft end thereof. The nacelle is arranged around the gas turbine engine and formed to define a first inlet at the fore end of the nacelle. The first inlet is arranged to direct a first portion of the flow of air aft into the first compressor. An outlet is formed in the aft end of the nacelle. The outlet is configured to direct exhaust gases from the turbine away from the nacelle.

The airframe is formed to define a second inlet. The second inlet is arranged to direct a second portion of the flow of air into the second compressor. The second inlet is oriented to at least partially face the tail of the airframe opposite the direction of the flow of air.

In some embodiments, the second inlet may be oriented parallel to the direction of the flow of air over the nacelle.

In some embodiments, the second inlet may be disposed at an angle relative a central axis of the second compressor.

In some embodiments, the airframe may include a valve coupled to the second inlet. The valve may be configured to move with respect to the airframe to at least partially block the flow of air through the second inlet.

In another embodiment, a gas turbine engine system is adapted for use with an aircraft. The gas turbine engine system comprises a gas turbine engine, a second compressor, and an airframe. The gas turbine engine includes an engine core having first compressor, a combustor, and a turbine coupled with the first compressor to drive the first compressor. The second compressor is operably coupled with the gas turbine engine.

The airframe includes a fuselage, a wing, a nose, and a tail disposed aft of the nose such that a direction of a flow of air over the airframe moves from the nose of the airframe aft towards the tail. The gas turbine engine is located inside the fuselage. The fuselage is formed to define a first inlet. The first inlet is arranged to direct a first portion of the flow of air aft into the first compressor. An outlet is configured to direct exhaust gases from the turbine away from the nacelle.

The fuselage is formed to define a second inlet. The second inlet is arranged to direct a second portion of the flow of air into the second compressor. The second inlet is oriented to at least partially face the tail of the airframe opposite the direction of the flow of air.

In some embodiments, the gas turbine engine may be located in a rear section of the fuselage.

In some embodiments, the fuselage may include at least one anti-swirl structure configured to reduce distortion of the flow of air.

In some embodiments, the airframe may include a valve coupled to the second inlet. The valve may be configured to move with respect to the airframe to at least partially block the flow of air through the second inlet.

These and other features of the present disclosure will become more apparent from the following description of the illustrative embodiments.

DETAILED DESCRIPTION OF THE DRAWINGS

Figures 1, 2:
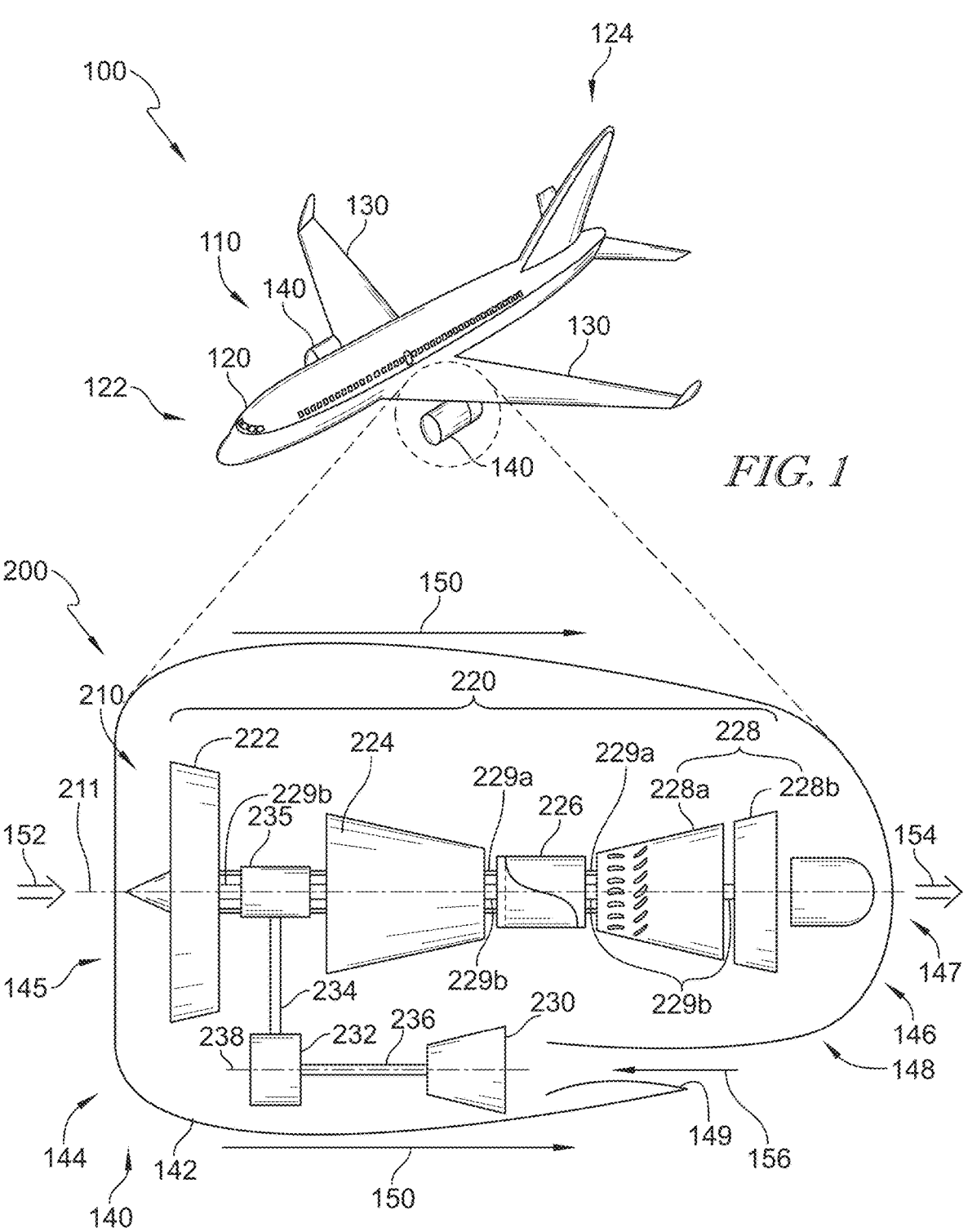
FIG. 1 is an elevated perspective view of an aircraft including an airframe having a fuselage, a wing disposed on either side of the fuselage, and a nacelle coupled to each wing, a gas turbine engine system is disposed within the nacelle.
FIG. 2 is a cutaway side view of one of the nacelles of the aircraft of FIG. 1, showing a casing of the nacelle encompasses the gas turbine engine system, which includes an engine core having a compressor, combustor, and turbine, and an auxiliary compressor, and showing a casing of the nacelle is shaped to form a inlet facing an aft of the nacelle and oriented in an opposite direction from a flow of air over the nacelle to directs a flow of air into the auxiliary compressor.

For the purposes of promoting an understanding of the principles of the disclosure, reference will now be made to a number of illustrative embodiments illustrated in the drawings and specific language will be used to describe the same.

A gas turbine engine system 200 is adapted for use with an aircraft 100, as shown in FIG. 1. The aircraft 100 includes an airframe 110 and the gas turbine engine system 200 disposed within the airframe 110. In the illustrative embodiment, the airframe 110 includes a fuselage 120 and a pair of wings 130. The fuselage 120 has a nose at a fore end 122 and a tail at an aft end 124, and the wings 130 are disposed on opposite sides of the fuselage 120 between the fore 122 and aft ends 124. In the illustrative embodiment, each of the wings 130 includes a nacelle 140 coupled to an underside of the wing 130. During flight, a flow or air flows over the airframe 110 from the nose at the fore end 122 to the tail at the aft end 124.

In the illustrative embodiment, a gas turbine engine system 200 is disposed within each of the nacelles 140. Each gas turbine engine system 200 includes a gas turbine engine 210 as shown in FIG. 2. The illustrative gas turbine engine system 200 includes a gas turbine engine 210 and an auxiliary compressor 230, as shown in FIG. 2. The gas turbine engine 210 includes an engine core 220. In the illustrative embodiment, the engine core 220 is disposed within the nacelle 140 and includes a fan 222, a first compressor 224, a combustor 226, a turbine 228, and a central shaft 229 including a low pressure (LP) shaft 229b and a high pressure (HP) shaft 229a as shown in FIG. 2. The LP shaft 229b and HP shafts 229a are concentric with each other, the LP shaft 229b being disposed inside the HP shaft 229a. In some embodiments, the engine core 220 may not include a fan 222. In some embodiments, the compressor 224 and/or the turbine 228 may include multiple stages. For example, as shown in FIG. 2, the turbine 228 includes a low pressure (LP) turbine 228b and a high pressure (HP) turbine 228a. Other embodiments of gas turbine engines 210 may include different suitable components.

In the illustrative embodiment, the fan 222 is coupled with the LP turbine 228b via the LP shaft 229b. The fan 222 is driven by the LP turbine 228b and the fan 222 provides thrust for propelling the aircraft 100. The compressor 224 compresses and delivers air to the combustor 226. The combustor 226 mixes fuel with the compressed air received from the compressor 224 and ignites the fuel. The hot, high pressure products of the combustion reaction in the combustor 226 are directed into the HP turbine 228a to cause the HP turbine 228a to rotate about a central axis 211 of the gas turbine engine 210 and drive the compressor 224. In other embodiments, the fan 222 may be omitted and the gas turbine engine 210 may include a shaft for driving a propeller, generator, or other system.

The auxiliary or second compressor 230 is disposed within the nacelle 140 and is offset from the central axis 211 of the engine core 220. The auxiliary compressor 230 is coupled to the gas turbine engine 220. In the illustrative embodiment, The auxiliary compressor 230 is coupled to auxiliary the HP shaft 229a and the HP turbine 228a via one or more shafts 234, 236 and gearboxes 232, 235. In the illustrative embodiment, a first gearbox 235, for example, a bevel gearbox, is disposed on the HP shaft 229a, between the fan 222 and the compressor 224. A radial shaft 234 extends from the first gearbox 235 to a second gearbox 232. The radial shaft 234 is driven by the HP shaft 229a via the first gear gearbox 235 to drive the second gearbox 232, transmitting power from the HP turbine 228a and HP shaft 229a to the second gearbox 232. An auxiliary shaft 236, which may be internal to the second gearbox 232, connects the second gearbox 232 to the auxiliary compressor 230 and transmits power from the second gearbox 232 to the auxiliary compressor 230.

The auxiliary compressor 230 is driven by the HP turbine 228a during operation of the gas turbine engine 210 to produce a flow of auxiliary compressed air. The auxiliary compressed air may be used for systems throughout the aircraft 100, such as cabin condition, cooling, deicing, or any other suitable purpose.

The gas turbine engine 210 is illustrated as being disposed within the nacelle 140; however, the gas turbine engine 210 may be located in other suitable locations. The nacelle 140 includes a fore end 144, an aft end 146, and an outer casing 142 extending from the fore end 144 to the aft end 146. In the illustrative embodiment, the outer casing 142 of the nacelle 140 is arranged to at least partially surround and encompass the gas turbine engine 210. During flight, a flow of air flows over the nacelle 140 from the fore end 144 to the aft end 146.

In the illustrative embodiment, the outer casing 142 is generally cylindrical in shape and tapered as it extends towards the aft end 146. In the illustrative embodiment, the outer casing 142 of the nacelle 140 is shaped to define a first inlet 145 at the fore end 144 of the nacelle 140 and an outlet 147 formed in the aft end 146 of the nacelle 140. The first inlet 145 is arranged to direct a first portion 152 of the flow of air aft 150 into the first compressor 224 of the engine core 220. The outlet 147 is arranged to direct exhaust gases 154 from the turbine 228 away from the nacelle 140.

The outer casing 142 is also shaped to define a second inlet 148. The second inlet 148 is arranged to direct a second portion 156 of the flow of air into the second compressor 230. The outer casing 142 of the nacelle 140 is shaped to define the second inlet 148 such that the second inlet 148 is oriented to at least partially face the aft end 146 of the nacelle 140. As shown in FIG. 2, the second inlet 148 is disposed to face a direction opposite the direction of the flow of the air 150 over the nacelle 140. The second inlet 148 is oriented to at least partially face the tail or aft end 124 of the airframe 110, in the opposite direction of the flow of the air 150.

The outer casing of the nacelle 140 is shaped to define the second inlet 148 such that the second inlet 148 is parallel to a central axis 238 of the auxiliary compressor 230 in the embodiment shown. In other embodiments, the inlet 148 may be arranged in different orientations as described herein. As shown in FIG. 2, the nacelle 140 is shaped to define walls 149 that define the second inlet 148. The walls 149 of the inlet 148 extend from an outer surface of the nacelle 140 in towards an inlet of the auxiliary compressor 230.

The second inlet 148 is oriented to face opposite the flow of air 150 flowing over the aircraft 100 and/or the nacelle 140 during flight. The second inlet 148 is oriented to face in an opposite direction than the flow of air 150 such that the second portion 156 of the flow of air has a total pressure close to ambient pressure with the aircraft at a first airspeed and a total air pressure below a forward facing total air pressure of the aircraft at a second airspeed. The forward facing total air pressure may refer to a total air pressure at an inlet or surface of the aircraft that faces the oncoming flow of air 150 impinging on and/or traveling over the aircraft 100. In the illustrative embodiment, the forward facing total air pressure may refer to a total air pressure at an inlet or surface of the aircraft that faces the fore end 122 of the aircraft, such as the first inlet 145.

The second airspeed may be a relatively high airspeed of the aircraft that is greater than the first airspeed. For example, in the illustrative embodiment, the first airspeed may correspond to the aircraft 100 being stationary, taxiing on the runway, or in the very early phase of takeoff. At the first airspeed, the auxiliary compressor 230 is able to draw air in through the second inlet 148 with minimum pressure loss. At the first airspeed, the orientation of the second inlet 148 doesn't affect the rate of air being drawn into the auxiliary compressor 230 because the total and static pressures external to inlet 148 are both close to ambient pressure in magnitude for all aircraft orientations as there is no aircraft speed, or relatively low aircraft speed.

The second airspeed may correspond to when the aircraft 100 is in flight, with a higher airspeed relative to the first airspeed. At the second airspeed, due to the second inlet's 148 orientation, the second inlet 148 has a reduced total pressure relative to the forward facing total pressure at the second airspeed of the aircraft 100. For example, the aft facing orientation of the second inlet 148 in a direction opposite the flow of air 150 results in a reduced pressure, and hence, a reduced mass flow rate of into the second inlet 148 than if the second inlet 148 were oriented to face the fore end 144 of the nacelle 140 and/or the aircraft 100, facing the oncoming flow of air 150 over the aircraft due to static and/or dynamic pressure of the air for the two orientations of the inlet.

In use, the air from the auxiliary compressor 230 may only be desired in specific aircraft conditions. Typically, these conditions correspond with low airspeed of the gas turbine engine 210. It may be desirous to operate the auxiliary compressor 230 at full or high power at the first airspeed, for example, when the aircraft 100 is on the ground or static. The air for the auxiliary compressor 230 may not be used for other conditions corresponding, typically, to relatively higher air speeds. In such conditions, it may be desired for the auxiliary compressor 230 to absorb much less power than it does at the first airspeed. Adding components to disengage selectively the auxiliary compressor 230 from the engine core 220 may add weight, costs, and complexity. Similarly adding components to reduce the compressor mass flow by other means could be problematic and expensive.

The system of the present disclosure allows the auxiliary compressor 230 to remain mechanically connected to and driven by the engine core 220 or another constant frequency drive while reducing the power used by the auxiliary compressor 230 when its air is not being used. The orientation of the second inlet 148 results in a low pressure recovery of the inlet 148 when the aircraft 100 is at the second airspeed, for example, when the aircraft 100 is inflight and has an appreciable speed or mach number consistent with inflight operation. As a result, the auxiliary compressor 230 is fed sufficient airflow and consumes available power at low air speeds while drawing on less power at higher airspeeds without relying on mechanisms to physically disengage or brake the rotation of the auxiliary compressor 230.

In the illustrative embodiment, the auxiliary compressor 230 cannot be disconnected from the engine core 220 inflight and would otherwise absorb large amount of power if using a high pressure recovery inlet, for example, similar to the first inlet 145 of the gas turbine engine 210. The aft facing orientation of the second inlet 148 acts causes low pressure recovery to reduce the work of the auxiliary compressor 230 at the second, inflight airspeed. The reduced rate of airflow through the second inlet 148 results in a reduced load of the auxiliary compressor 230. The aft facing orientation of the second inlet 148 passively reduces the work done by the auxiliary compressor 230 as compared to if the auxiliary compressor 230 were fed by a forward facing inlet when at the second airspeed, but will have minimal impact when the auxiliary compressor 230 is used at the first, stationary airspeed. This is achieved by having the second inlet 148 disposed at a location of relatively low static air pressure inflight as a consequence of being in a zone of relatively high air Mach number. The second inlet 148 is oriented to not face the direction of the air flow 150. In some embodiments, the second inlet 148 faces perpendicular or away from the direction of air flow 150 at the location of the second inlet 148. The second inlet is designed to have enough area to provide pressure recovery in static conditions.

The orientation of the second inlet 148 may also help to avoid ingesting water and hail from the atmosphere by facing away from the direction of incoming air 150 so that water and ice particles in the air stream will not be able to enter the inlet 148 as a result of the momentum of these particles. The orientation of the second inlet 148 may allow a portion of air 156 to be drawn into the second inlet 148, but particles within the air, such as ice or debris, continue to flow past the second inlet 148 due to their momentum. Similarly the orientation of the second inlet 148 may also help in reducing the ingestion of birds and foreign object debris and damage (FOD) inflight by facing away from the direction of incoming air 150.

The relative lower pressure recovery reduces the inlet pressure at the second inlet 148, which will reduce the physical flow rate for a given intake area. The compressor work of the auxiliary compressor 230 is reduced by reducing the mass flow rate at second inlet 148. One way this could be done is to reduce speed of the aircraft 100, but another way is to reduce airflow at an inlet of the auxiliary compressor 230 is to reduce the pressure recovery of the inlet air when the aircraft is at the second airspeed. This can be achieved by the orientation of the second inlet 148 described herein.

The airflow of the auxiliary compressor 230 is related to temperature and pressure at the inlet 148. By lowering the pressure term, the mass air flow rate through the inlet 148 and auxiliary compressor 230 goes down. The present disclosure may lower the risk of efficiency decreasing and the auxiliary compressor 230 pulling more power inadvertently. The low pressure recovery at the second inlet 148 caused by the orientation and position of the second inlet 148 may reduce the total pressure at the gas turbine engine 210, which reduces the mass flow and hence the amount of work used by the auxiliary compressor 230. This results in the output pressure of the auxiliary compressor 230 being lower, the mass flow through the second inlet 148 being lower, and the work used by the auxiliary compressor 230 being lower.

Figure 3:
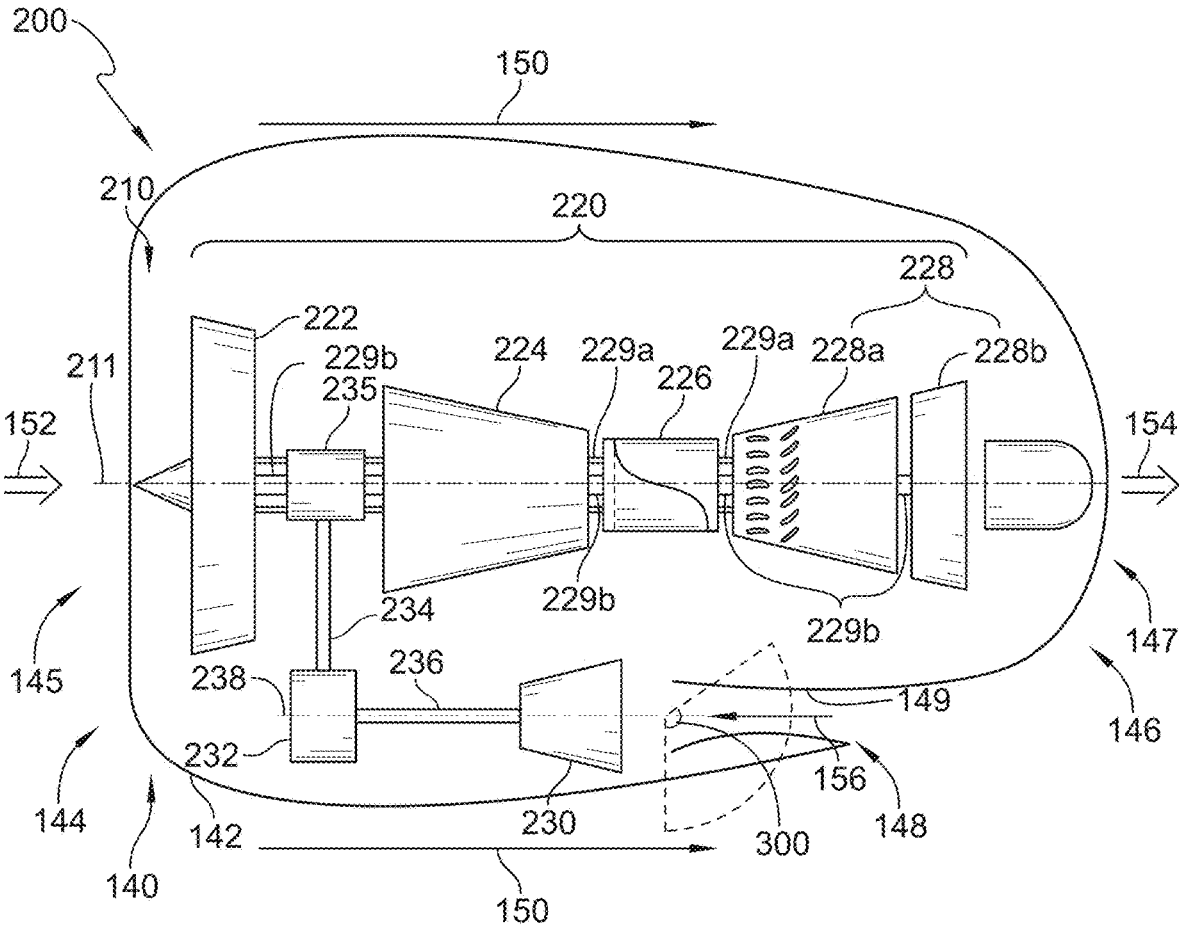
FIG. 3 is a diagrammatic side view of the nacelle of FIG. 2, showing a range of upwards or downwards angles the aft facing inlet may be oriented relative to a central axis of the auxiliary compressor.
Figure 4:
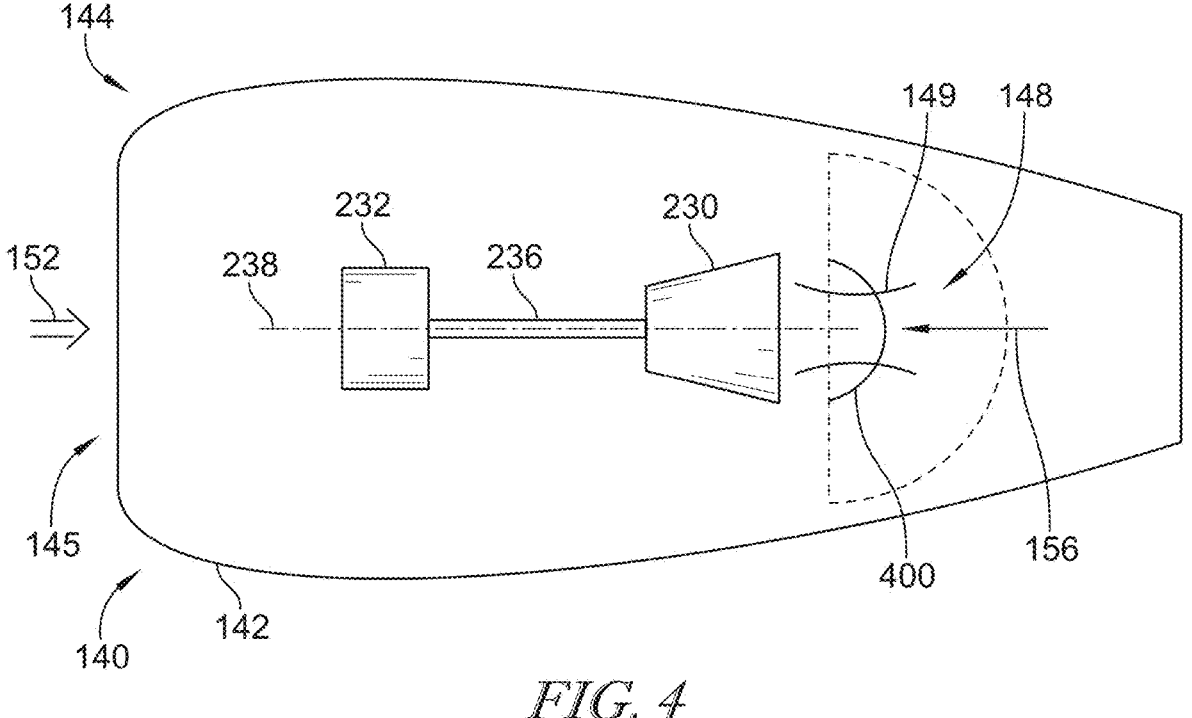
FIG. 4 is a diagrammatic top view of the nacelle of FIG. 2 with the engine core removed, showing a range of sideward angles the aft facing inlet may be oriented relative to a central axis of the auxiliary compressor.

In the illustrative embodiment, as show in FIGS. 3-4, the second inlet 148 is aligned with a central axis 238 of the auxiliary compressor 230, facing directly aft or towards the aft end 146 of the nacelle. In other embodiments, the second inlet 148 is angled relative the central axis 238 of the auxiliary compressor 230. As shown in FIG. 3 the second inlet may be angled up or down relative to the central axis of the auxiliary compressor. FIG. 3 shows a range of possible angles 300 the second inlet 148 may be oriented at with respect to the central axis of the auxiliary compressor 230.

For example, in some embodiments, the second inlet 148 may be angled upwards from the central axis 238, towards an upper surface of the airframe 110 or nacelle 140, at an angle between 0-45 degrees relative to the central axis 238. In some embodiments, the second inlet 148 may be angled downwards from the central axis 238, towards a lower surface of the airframe 110 or nacelle 140, at an angle between 0-90 degrees relative to the central axis 238. At a downwards angle of 90 degrees, the second inlet 148 is oriented perpendicular to the central axis 238, and may be generally perpendicular to a lower outer surface of the nacelle 140.

As shown in FIG. 4, the second inlet 148 may be angled to the left or right, or sidewards, relative to the central axis 238 of the auxiliary compressor. FIG. 4 shows a range of possible angles 400 the second inlet 148 may be oriented at with respect to the central axis 238 of the auxiliary compressor 230. As shown in in FIG. 4, the second inlet 148 may be oriented to the left or right at an angle between 0-90 degrees relative to the central axis 238 of the auxiliary compressor 230. When at an angle of 90 degrees, the second inlet may be perpendicular to the central axis 238, pointing out of a side surface of the nacelle 140. In other embodiments, both the auxiliary compressor 230 and the second inlet 148 may be angled relative to the central axis 211 of the engine core 220.

The orientation and angle of the second inlet 148 may also help prevent ingestion of particles through the second inlet 148. Elimination of ice and hail will avoid the ice accretion on leading edge surfaces of the compressor 230 and its inlet vanes, and avoid or reduce the use of anti-ice heating. The aft facing orientation of the second inlet 148 may reduce icing susceptibility, water and hail ingestion risk, foreign object debris, and bird ingestion risk inflight, ice slab ingestion risk, and/or risk of bird or other foreign object struck by the aircraft 100 from entering the compressor 230. In some embodiments, the second inlet 148 is angled downwards, which will further help to avoid rain, snow and hail ingestion in the second inlet 148 with aircraft static.

Figure 8:
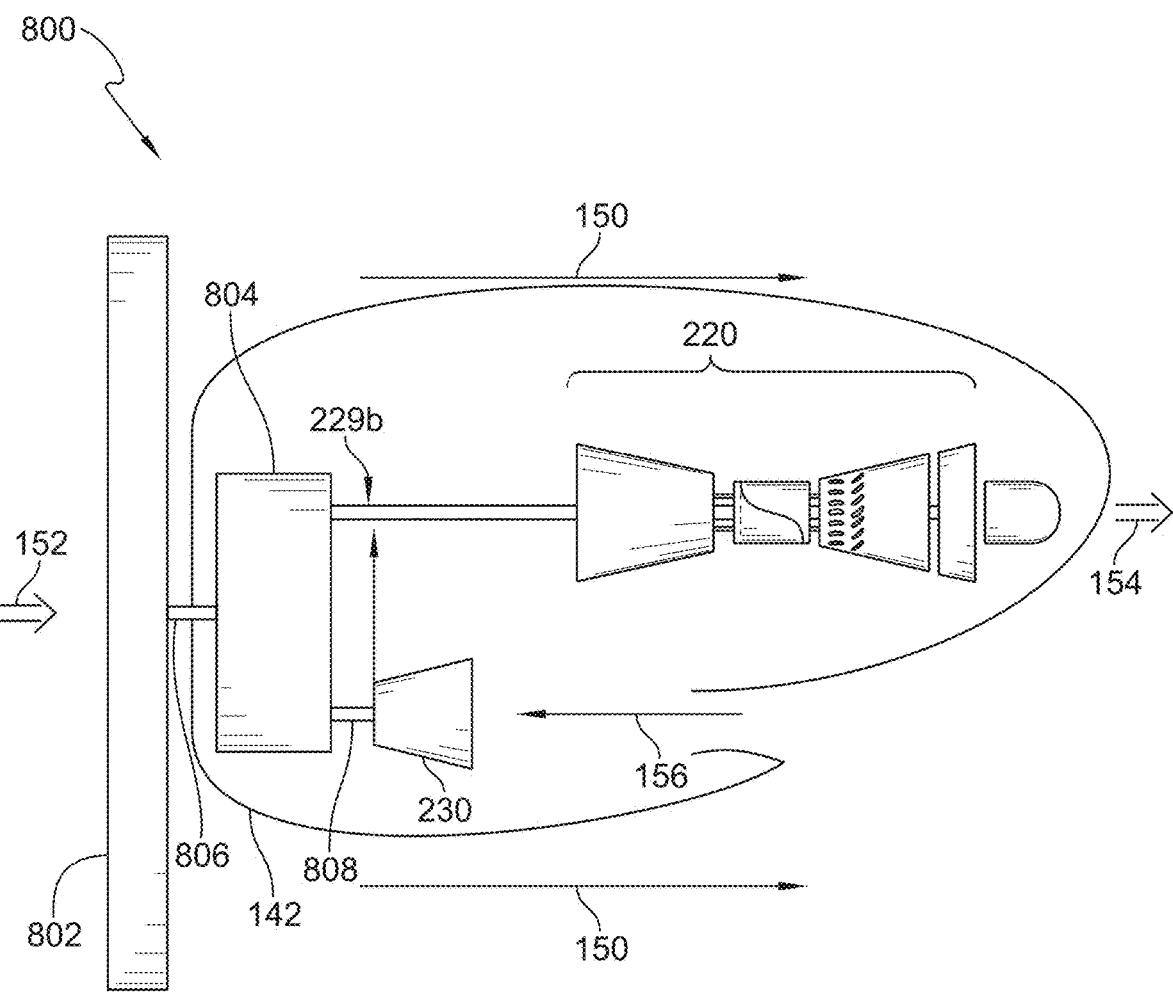
FIG. 8 is an embodiment of the nacelle of FIG. 1, showing the gas turbine engine system includes a turboprop engine with a propeller.

Other embodiments of gas turbine engines 210 may include different suitable components. For example, as shown in FIG. 8, an embodiment of the gas turbine engine system may comprise a turboprop engine 800 having a propeller 802 and a prop gearbox 804 disposed towards the front of the nacelle 140. The engine core 220 is connected to the prop gearbox 804 via the LP shaft 229*b*, transmitting power from the engine core 200 to the prop gearbox 804. The propeller 802 is connected to the prop gearbox 804 via a prop shaft 806, which transmits power from the prop gearbox 804 to the propeller 802. The auxiliary shaft 808 connects the prop gearbox 806 to the auxiliary compressor 230, driving the auxiliary compressor 230.

Figure 9:
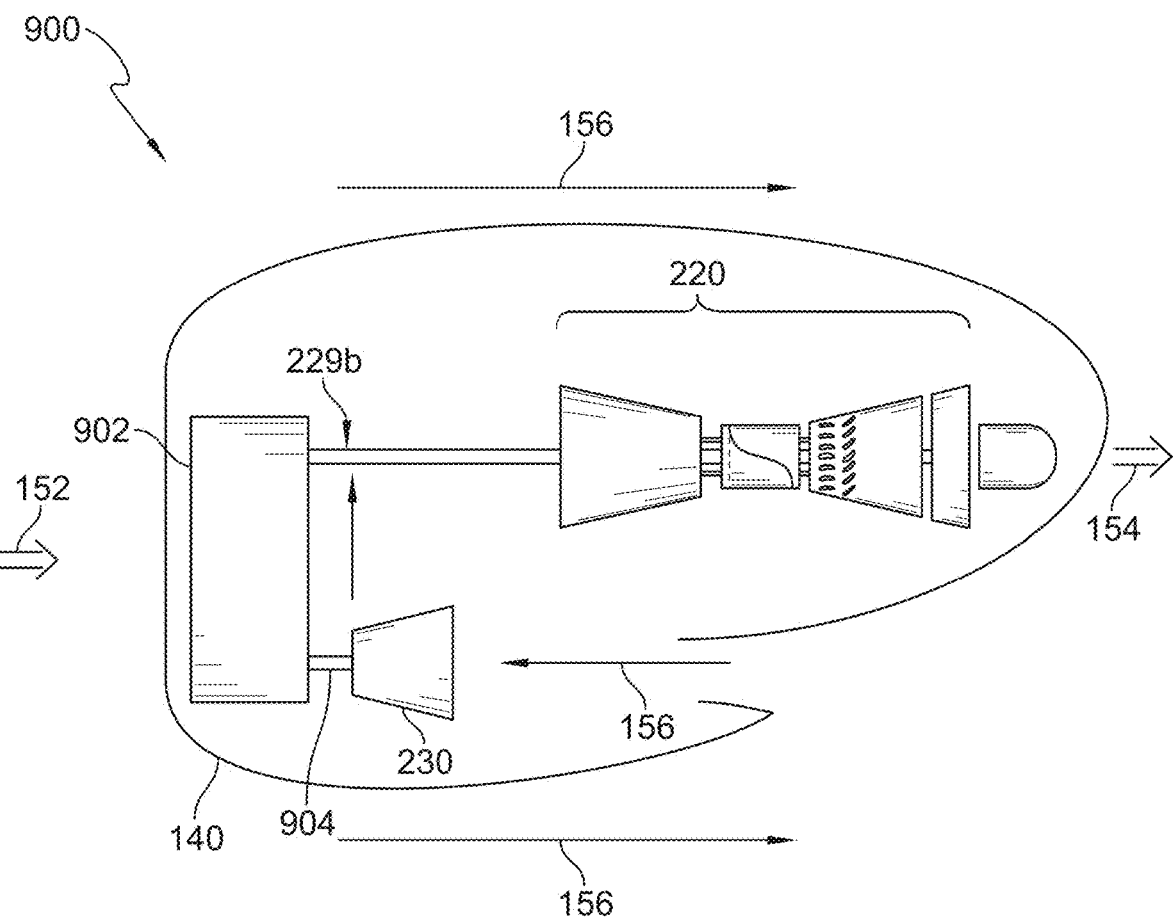
FIG. 9 is an embodiment of the nacelle of FIG. 1, showing the gas turbine engine system includes a turboshaft engine with a power gearbox.

Alternatively, as shown in FIG. 9, an embodiment of the gas turbine engine system may comprise a turboshaft engine 900 having a power gearbox 902. The engine core 220 is connected to the power gearbox 902 via the LP shaft 229*b*, transmitting power from the engine core 200 to the power gearbox 902. The auxiliary shaft 904 connects the power gearbox 902 to the auxiliary compressor 230, driving the auxiliary compressor 230.

Figure 5:
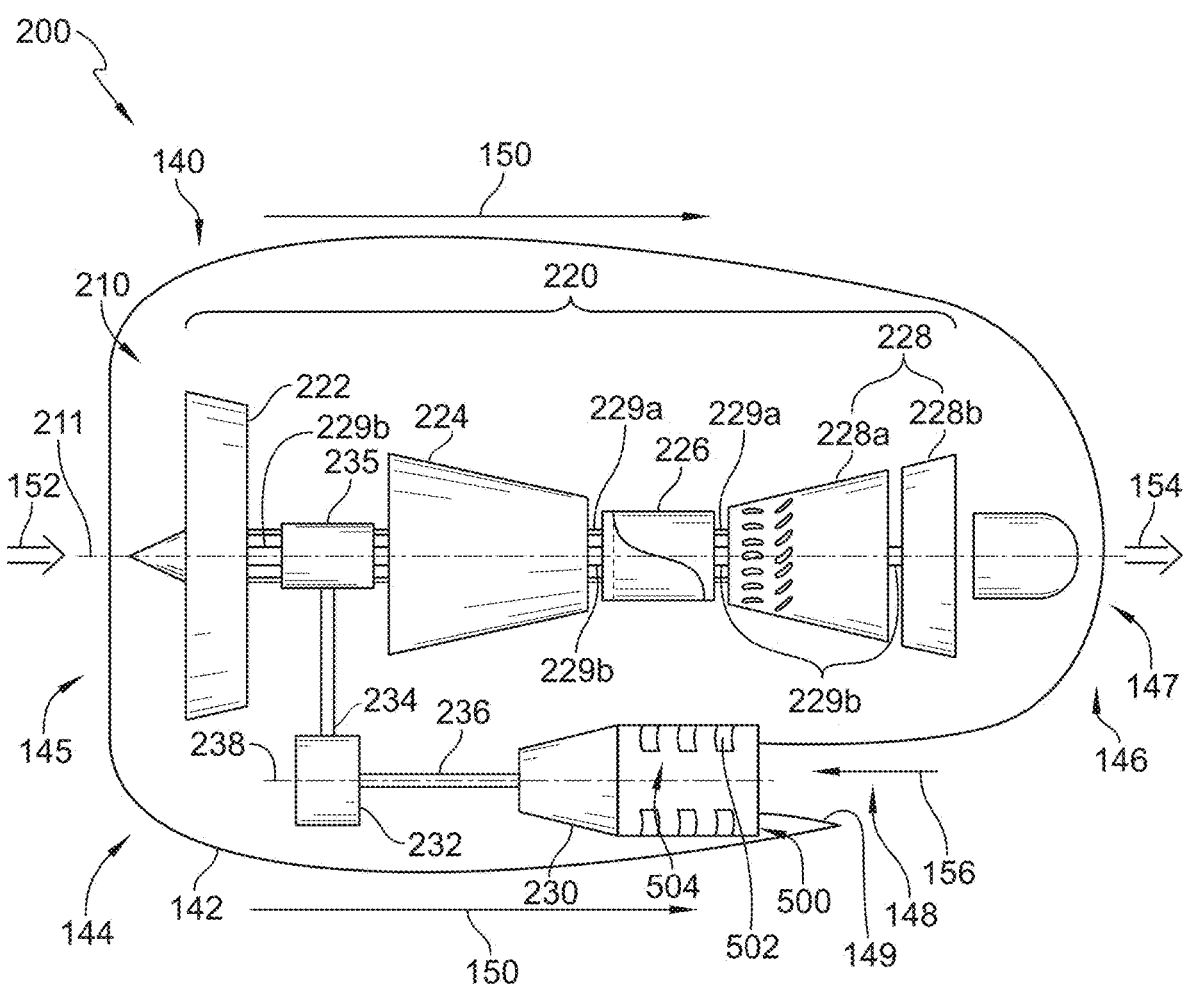
FIG. 5 is an embodiment of the nacelle of FIG. 1, showing a plenum disposed within the nacelle between the auxiliary inlet and the auxiliary compressor, the plenum including a plurality of anti-swirl vanes, where the plenum helps settle or condition the flow of air from the aft facing inlet before it is received by the auxiliary compressor.
Figure 6:
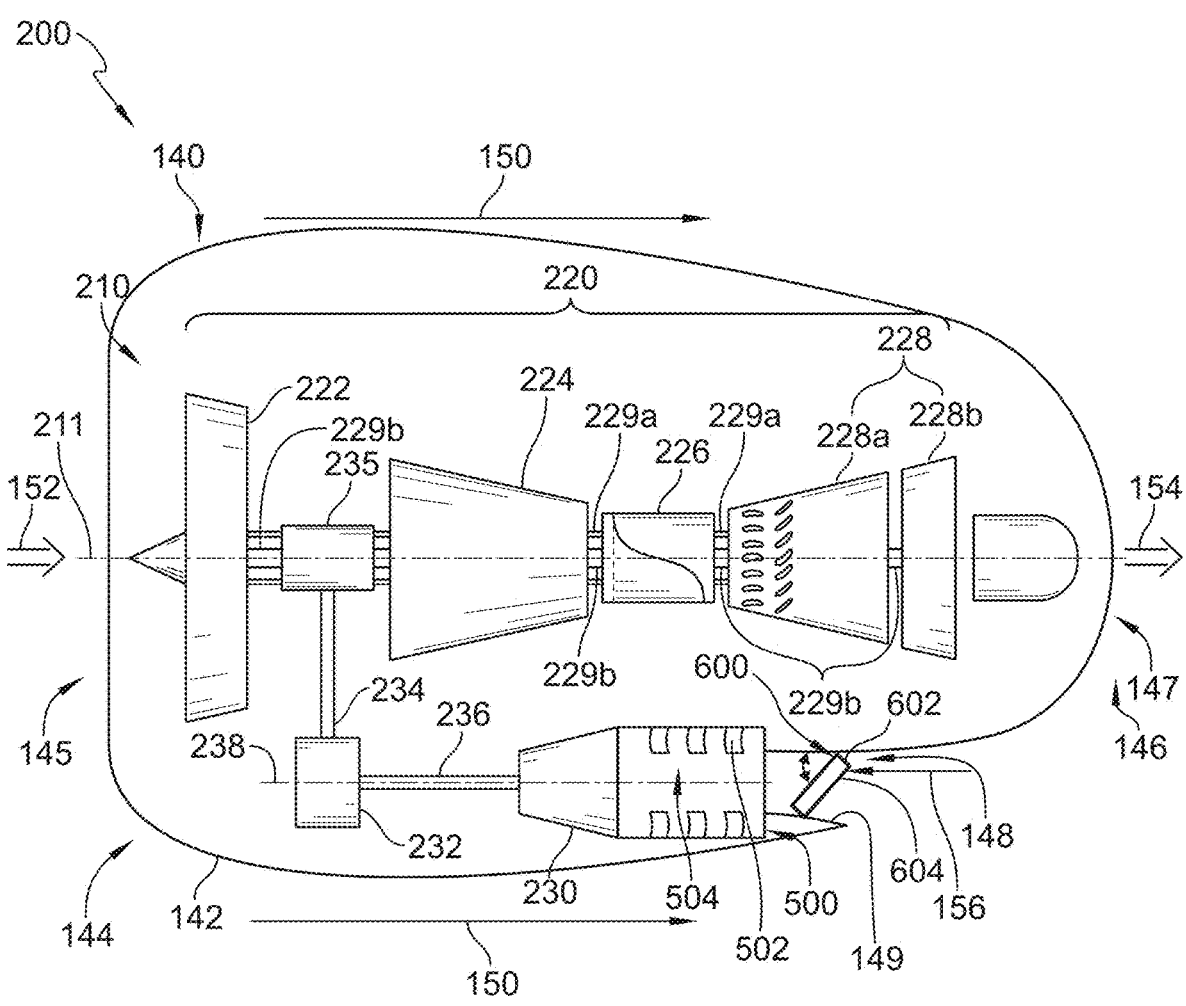
FIG. 6 is an embodiment of the nacelle of FIG. 1, showing a valve disposed within the aft facing inlet, the valve including a door arranged to pivot about and a rotation point disposed at an end of the flap to control a flow of air through the aft facing inlet.
Figure 7:
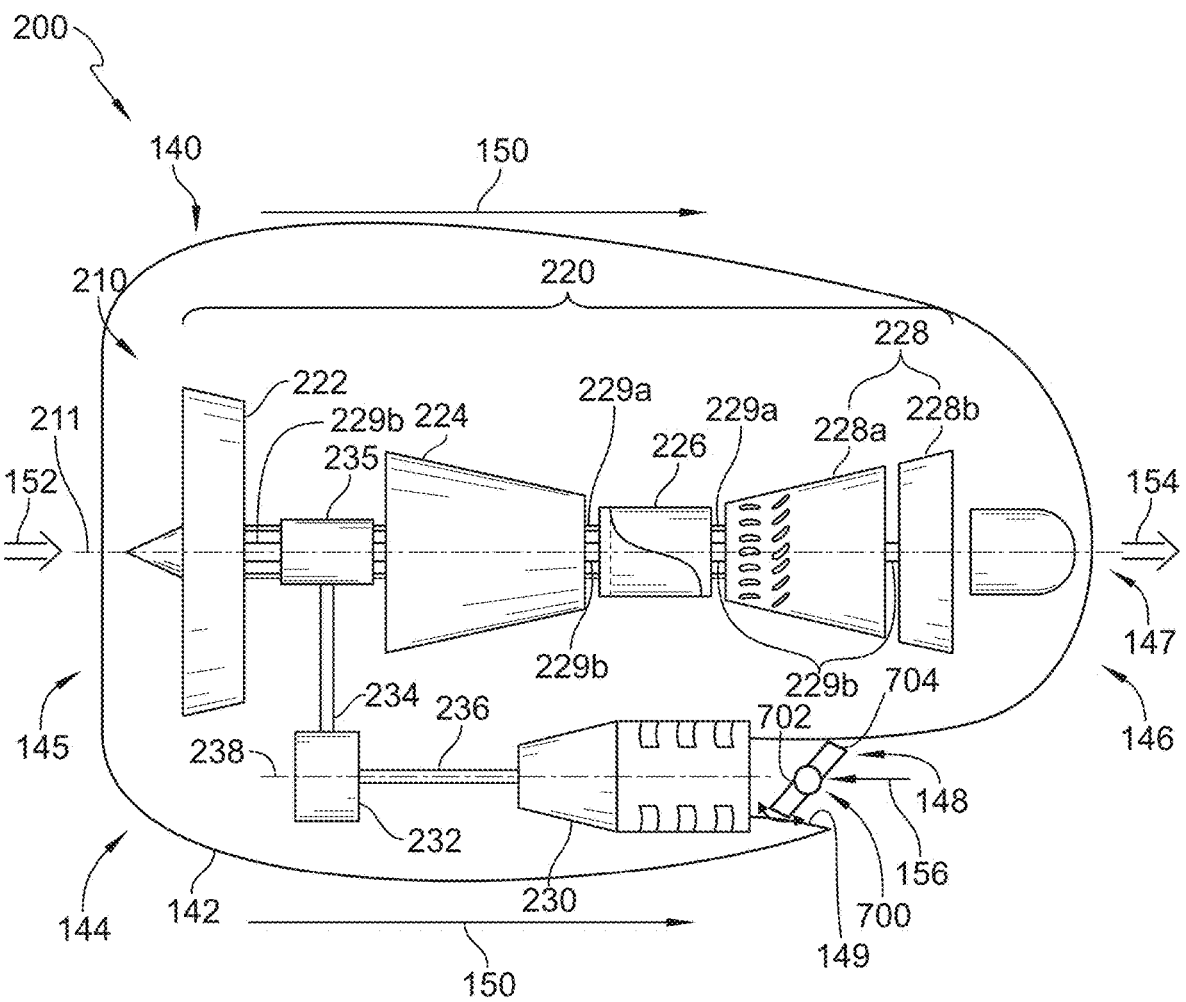
FIG. 7 is an embodiment of the nacelle of FIG. 1, showing a valve disposed within the aft facing inlet, the valve including a door arranged to rotate about and a rotation point disposed at the center of the flap to control a flow of air through the aft facing inlet.

As shown in FIGS. 5-7, the nacelle 140 includes a plenum 500 disposed between the auxiliary compressor 230 and the second inlet 148. The plenum may comprise a chamber 504 or other suitable structure that defines a space through which the air entering the second inlet 148 flows before entering the auxiliary compressor 230. The plenum 500 acts to manage distortion of the flow of air coming through the second inlet 148 before entering the auxiliary compressor 230. As shown in FIGS. 5-7 the plenum 500 may include one or more flow conditioning devices 502, such as anti-swirl vanes, or other conditioning structures to straighten the flow of air through the plenum 500 before entering the auxiliary compressor 230.

In some embodiments, the nacelle 140 includes a valve 600 or other flow control device disposed in the second inlet 148 to further control the flow of air thought the second inlet 148 that flows to the auxiliary compressor 230. The valve 600 is arranged to control and partially restrict the flow through the second inlet 148. In the illustrative embodiment, the valve 600 includes a door or flap 604 and a rotation point 602 or hinge about which the door 604 rotates.

As shown in FIG. 6, the valve 600 is coupled to the walls 149 of the nacelle 140 defining the second inlet 148 such that the valve 600 can pivot relative to the surface of the wall 149 between an open position, a closed position, or any position in between. As shown in FIG. 6, the rotation point 602 is disposed at an end of the door 604. In some embodiments, as shown in FIG. 7, the rotation point 702 of the valve 700 is coupled to a central portion of the door 704 such that the valve 700 can rotate between an open position, a closed position, or any position in between.

Figure 10:
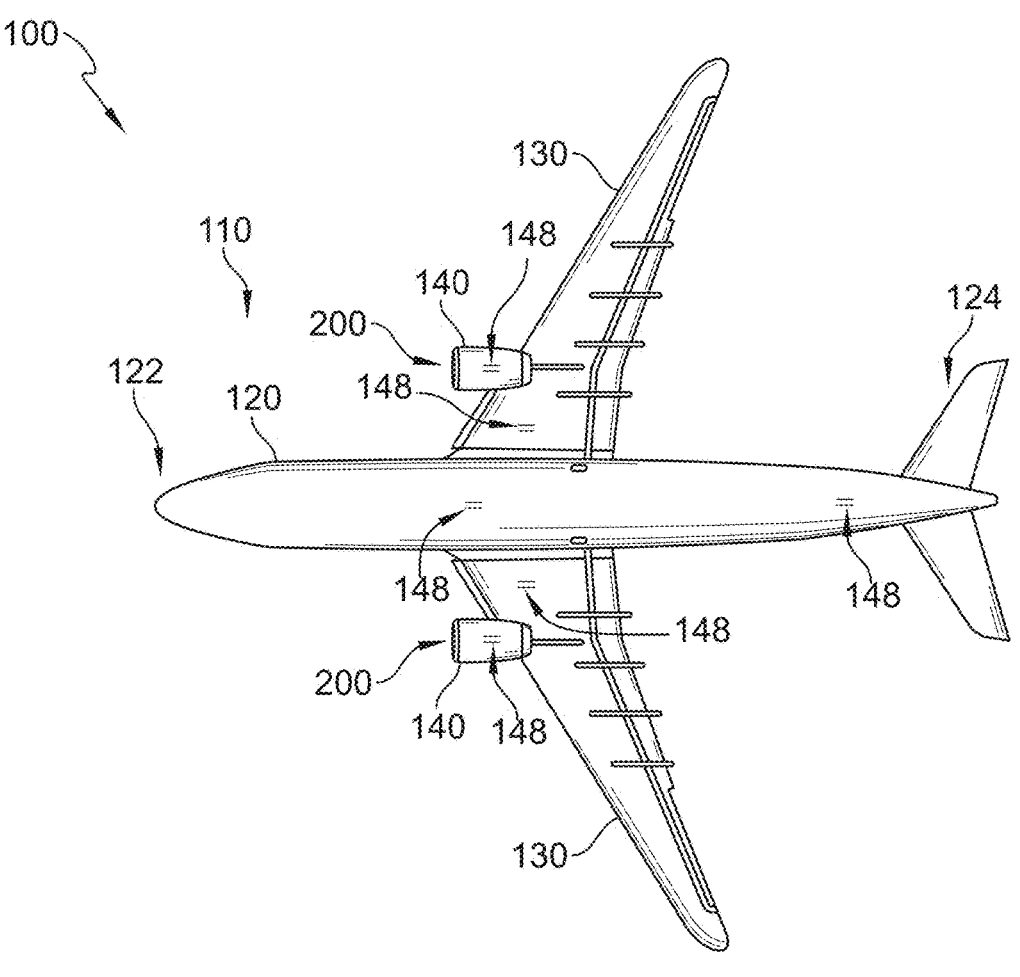
FIG. 10 is a bottom view of an airframe of the aircraft of FIG. 1, showing possible locations of the aft facing inlet on the nacelle, a wing, and/or a fuselage of the airframe.
Figure 11:
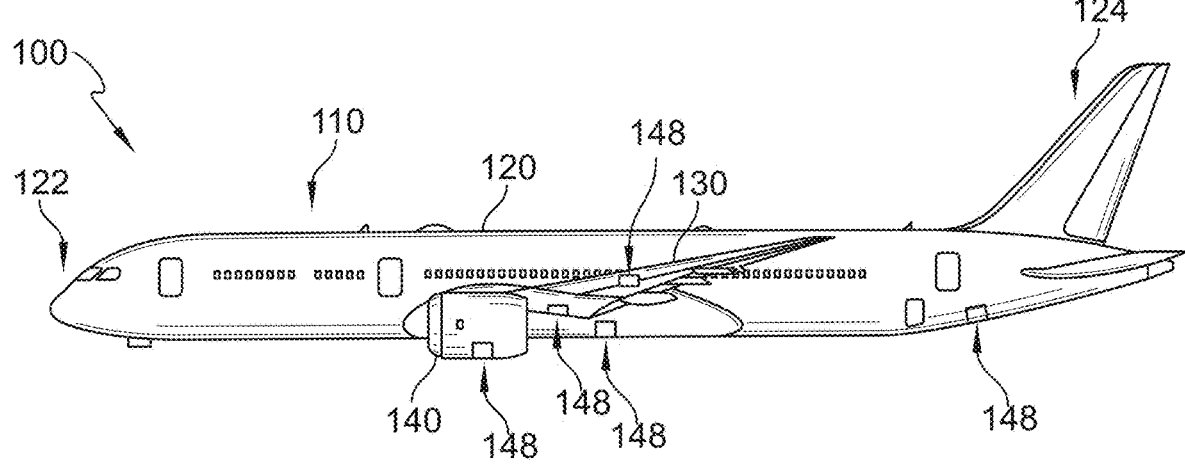
FIG. 11 is a side view of the airframe of FIG. 10, showing the showing possible locations of the aft facing inlet on the nacelle, the wing, and/or the fuselage of the airframe.

In other embodiments, the second inlet 148 may be disposed in a different area of the airframe 110 than the nacelle 140. For example, as shown in FIGS. 10-11, the second inlet 148 may be disposed in an outer surface of the fuselage 120, the nacelle 140, or wing 130 of the aircraft 100. The second inlet 148 may be disposed in a rear portion of the fuselage 120 near the tail 124. In some embodiments, the gas turbine engine 220 may be an auxiliary power unit (APU), for example, disposed in the fuselage 120 and the second compressor 230 may be coupled to the APU. In some embodiments, the second compressor 230 may be coupled to any power source of the aircraft 100 or other fast moving vehicle. The second inlet 148 may be a rear facing inlet disposed on any outer surface of the aircraft 100.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine system adapted for use with an aircraft, the gas turbine engine system comprising:
   a gas turbine engine including a gearbox and an engine core having a first compressor, a combustor, and a turbine coupled with the first compressor and the gearbox to drive the first compressor and the gearbox,
   a second compressor operably coupled with the gas turbine engine and driven by the turbine via the gearbox during operation of the gas turbine engine to produce a flow of auxiliary compressed air usable by the aircraft, and
   a nacelle extending from a fore end and an aft end thereof, a direction of a flow of air over the aircraft flowing from the fore end to the aft end, the nacelle arranged around the gas turbine engine and formed to define (i) a first inlet at the fore end of the nacelle and arranged to direct a first portion of the flow of air aft into the first compressor, (ii) an outlet formed in the aft end of the nacelle and configured to direct exhaust gases from the turbine away from the nacelle, and (iii) a second inlet in direct fluid communication with ambient air and arranged to direct a second portion of the flow of air into the second compressor, the second portion of the flow of air being separate from the first portion of the flow of air,
   wherein the second inlet is oriented such that the second portion of the flow of air flows through the second inlet in a direction defined by the aft end of the nacelle toward the fore end of the nacelle.

2. The gas turbine engine system of claim 1, wherein the second inlet has a lower mass flow rate of the second portion of the flow of air at an inflight airspeed than a mass flow rate of the first portion of the flow of air at the first inlet due to the lower pressure so that the second compressor consumes less work from the turbine when the aircraft is inflight.

3. The gas turbine engine system of claim 1, wherein the nacelle further includes a plenum disposed between the second inlet and the second compressor configured to receive the second portion of the flow of air from the second inlet before the second portion of the flow of air enters the second compressor.

4. The gas turbine engine system of claim 3, wherein the plenum includes at least one anti-swirl structure configured to reduce distortion of the second portion of the flow of air.

5. The gas turbine engine system of claim 4, wherein the plenum includes a plurality of anti-swirl vanes.

6. The gas turbine engine system of claim 1, wherein the nacelle further includes a valve coupled to the second inlet and configured to move with respect to the nacelle to at least partially block the second portion of the flow of air through the second inlet.

7. The gas turbine engine system of claim 6, wherein the valve is configured to pivot or rotate with respect to the nacelle to at least partially block the second portion of the flow of air through the second inlet.

8. The gas turbine engine system of claim 1, where the second inlet includes at least one inlet guide vane that is configured to control an air flow rate into the second compressor.

9. The gas turbine engine system of claim 1, wherein the second inlet and the second compressor are oriented in the same direction.

10. The gas turbine engine system of claim 1, wherein the second inlet is oriented parallel to the direction of the flow of air over the nacelle.

11. The gas turbine engine system of claim 1, wherein the second inlet is disposed at an angle relative a central axis of the second compressor.

12. The gas turbine engine of claim 1, wherein the second portion of the flow of air does not flow through the engine core prior to flowing through the second compressor.

13. A gas turbine engine system adapted for use with an aircraft, the gas turbine engine system comprising:

a gas turbine engine including a gearbox and an engine core having a first compressor, a combustor, and a turbine, a second compressor operably coupled with the gas turbine engine and driven by the turbine via the gearbox, and an airframe including fuselage, a wing, and a nacelle, a nose and a tail disposed aft of the nose such that a direction of a flow of air over the airframe moves from the nose of the airframe aft towards the tail, the nacelle extending from a fore end and an aft end thereof, the nacelle arranged around the gas turbine engine and formed to define a first inlet at the fore end of the nacelle and arranged to direct a first portion of the flow of air aft into the first compressor, and an outlet formed in the aft end of the nacelle and configured to direct exhaust gases from the turbine away from the nacelle, wherein the airframe is formed to define a second inlet in direct fluid communication with ambient air and arranged to direct a second portion of the flow of air into the second compressor, the second portion of the flow of air being separate from the first portion of the flow of air, the second inlet is oriented such that the second portion of the flow of air flows through the second inlet in a direction defined by the aft end of the nacelle toward the fore end of the nacelle.

14. The gas turbine engine system of claim 13, wherein the second inlet is oriented parallel to the direction of the flow of air over the nacelle.

15. The gas turbine engine system of claim 13, wherein the second inlet is disposed at an angle relative a central axis of the second compressor.

16. The gas turbine engine system of claim 13, wherein the airframe further includes a valve coupled to the second inlet and configured to move with respect to the airframe to at least partially block the second portion of the flow of air through the second inlet.

17. The gas turbine engine of claim 16, wherein the valve is configured to move between an open position in which the second portion of the flow of air is free to enter the second inlet and a closed position in which the second portion of the flow of air is blocked from entering the second inlet.

18. The gas turbine engine system of claim 17, wherein the airframe further includes a plenum disposed between the valve and the second compressor and configured to receive the second portion of the flow of air from the second inlet before the second portion of the flow of air enters the second compressor.

19. The gas turbine engine of claim 18, wherein the plenum includes a plurality of anti-swirl vanes located therein.

* * * * *